UNITED STATES PATENT OFFICE.

HEINRICH JORDAN, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

REDDISH-BLUE TRISAZO DYE.

999,797. Specification of Letters Patent. Patented Aug. 8, 1911.

No Drawing. Application filed March 14, 1911. Serial No. 614,395.

*To all whom it may concern:*

Be it known that I, HEINRICH JORDAN, doctor of philosophy, chemist, citizen of the German Empire, residing at Leverkusen, near Cologne, Germany, have invented new and useful Improvements in Reddish-Blue Trisazo Dye, of which the following is a specification.

I have discovered that valuable trisazo dyestuffs, which can be diazotized and developed on the fiber can be obtained by first combining the diazo compounds of acidyl-para-phenylenediamins with a middle component capable of being after combination further diazotized, rediazotizing the products thus obtained, combining them with a second molecule of such middle component, rediazotizing the aminodisazo compounds and combining the diazo bodies thus obtained with pyrazolons, such as methyl-phenyl-pyrazolon, methyl-aryl-pyrazolon sulfonic acids, methyl-aryl-pyrazolons, naphthylpyrazolons or their sulfonic acids, methyl-pyrazolons, pyrazolon carboxylic acids, sulfo-aryl-pyrazolon-carboxylic acids and finally removing the acidyl group from the dyestuffs. The coloring matters thus produced are after being dried and pulverized in the shape of their alkaline salts dark powders soluble in water; yielding upon treatment with hydrosulfite and alkali paraphenylenediamin, one or two diamins and an aminopyrazolon. They dye cotton in from violet to blue shades which can be diazotized and developed on the fiber. On developing them for instance with beta-naphthol pure violet to blue shades are obtained of very good fastness to washing and to light and distinguished by the ease with which they can be discharged with hydrosulfites to a pure white.

In order to illustrate the new process more fully the following example is given, the parts being by weight:—100 parts of oxalyl-para-phenylenediamin are dissolved in 7000 parts of water with the addition of 65 parts of sodium carbonate and are after acidulation with 350 parts of hydrochloric acid (19° Bé.), diazotized at 0 to 5° C. with 69 parts of sodium nitrite. The diazo solution is combined at 10–15° C. with a solution of 245 parts of the sodium salt of 1-naphthylamin-6-sulfonic acid containing 220 parts of sodium acetate (100 per cent.), the combination takes place within a few minutes. The mixture is neutralized with sodium carbonate or soda lye, mixed with 69 parts of sodium nitrite and then diazotized by adding at 10–15° C. 1000 parts of hydrochloric acid.

The diazotation is complete after stirring the solution for 1–2 hours and the resulting diazo compound is filtered off, mixed with ice and water and again combined with the same quantity of 1-naphthylamin-6-sulfonic acid in the presence of the same quantity of sodium acetate. After stirring the mixture for four hours, it is neutralized with caustic soda lye, cooled to 0° C. and diazotized with 69 parts of sodium nitrite and 800 parts of hydrochloric acid solution (19° Bé.) The mixture is stirred for 3–4 hours and the diazo compound is then allowed to run into a solution of 174 parts of 1-phenyl-3-methyl-5-pyrazolon containing 800 parts of sodium carbonate. The dyestuff thus obtained is salted out, redissolved in 14000 parts of water and heated to boiling. 1380 parts of a 30 per cent. soda lye are added. The mixture is boiled for half an hour, diluted with cold water, neutralized with hydrochloric acid and filtered off. The coloring matter which has probably the following constitution:

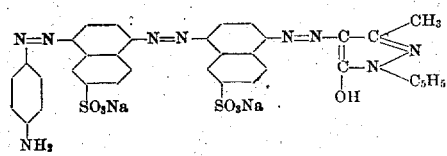

is after being dried and pulverized in the shape of its sodium salt a dark powder soluble in water with a bluish-violet color; soluble in concentrated sulfuric acid with a green color; yielding upon treatment with hydrosulfite and alkali para-phenylenediamin, 1.4-diaminonaphthalene-6-sulfonic acid and 1-phenyl-3-methyl-4-amino-5-pyrazolon. It dyes cotton in pure reddish-blue shades, which when diazotized on the fiber and developed with beta-naphthol change into slightly bluer shades of excellent fastness to washing and to light. It can be discharged to a pure white with hydrosulfite.

The above described process is carried out in an analogous manner on using other middle components, such as alpha-naphthylamin, 1-naphthylamin-7-sulfonic acid, aminonaphthol-sulfonic acid, meta-toluidin, cresidin, or any other of the above mentioned end components. Of course two different middle components can be used instead of one compound.

I claim:—

1. The herein described new trisazo dyestuffs obtainable from para-phenylenediamin, two molecules of a suitable middle component and a pyrazolon, which dyes are after being dried and pulverized in the shape of their alkaline salts dark powders soluble in water; yielding upon reduction with hydrosulfite and alkali para-phenylenediamin, an aromatic diamin and an aminopyrazolon; dyeing cotton from violet to blue shades which can be diazotized and developed on the fiber, shades fast to washing and to light being obtained which can be discharged with hydrosulfite to a pure white, substantially as described.

2. The herein described new trisazo dyestuff obtainable from para-phenylenediamin, two molecules of 1-naphthylamin-6-sulfonic acid and 1-phenyl-3-methyl-5-pyrazolon, which is after being dried and pulverized in the shape of its sodium salt a dark powder soluble in water with a bluish-violet coloration and in concentrated sulfuric acid with a green coloration, yielding upon treatment with hydrosulfite and alkali para-phenylenediamin, 1.4-diaminonaphthalene-6-sulfonic acid and 1-phenyl-3-methyl-4-amino-5-pyrazolon and dyeing cotton reddish-blue shades, which when diazotized on the fiber and developed with beta-naphthol change into slightly bluer shades of excellent fastness to washing and to light which can be discharged to a pure white with hydrosulfite, substantially as described.

In testimony whereof I have hereunto set my hand in the presence of two subscribing witnesses.

HEINRICH JORDAN. [L. S.]

Witnesses:
CHAS. J. WRIGHT,
ALFRED HENKEL.

Copies of this patent may be obtained for five cents each, by addressing the "Commissioner of Patents. Washington, D. C."

---

Corrections in Letters Patent No. 999,797.

It is hereby certified that in Letters Patent No. 999,797, granted August 8, 1911, upon the application of Heinrich Jordan, of Leverkusen, near Cologne, Germany, for an improvement in "Reddish-Blue Trisazo Dyes" errors appear in the printed specification requiring correction as follows: Page 1, line 44, the number "100" should read *180;* same page, line 88, formula, the symbol "$C_8H_5$" should read $C_6H_5$; and that the said Letters Patent should be read with these corrections therein that the same may conform to the record of the case in the Patent Office.

Signed and sealed this 3d day of October, A. D., 1911.

[SEAL.]

E. B. MOORE,

*Commissioner of Patents.* amin, 1-naphthylamin-7-sulfonic acid, aminonaphthol-sulfonic acid, meta-toluidin, cresidin, or any other of the above mentioned end components. Of course two different middle components can be used instead of one compound.

I claim:—

1. The herein described new trisazo dyestuffs obtainable from para-phenylenediamin, two molecules of a suitable middle component and a pyrazolon, which dyes are after being dried and pulverized in the shape of their alkaline salts dark powders soluble in water; yielding upon reduction with hydrosulfite and alkali para-phenylenediamin, an aromatic diamin and an aminopyrazolon; dyeing cotton from violet to blue shades which can be diazotized and developed on the fiber, shades fast to washing and to light being obtained which can be discharged with hydrosulfite to a pure white, substantially as described.

2. The herein described new trisazo dyestuff obtainable from para-phenylediamin, two molecules of 1-naphthylamin-6-sulfonic acid and 1-phenyl-3-methyl-5-pyrazolon, which is after being dried and pulverized in the shape of its sodium salt a dark powder soluble in water with a bluish-violet coloration and in concentrated sulfuric acid with a green coloration, yielding upon treatment with hydrosulfite and alkali para-phenylenediamin, 1.4-diaminonaphthalene-6-sulfonic acid and 1-phenyl-3-methyl-4-amino-5-pyrazolon and dyeing cotton reddish-blue shades, which when diazotized on the fiber and developed with beta-naphthol change into slightly bluer shades of excellent fastness to washing and to light which can be discharged to a pure white with hydrosulfite, substantially as described.

In testimony whereof I have hereunto set my hand in the presence of two subscribing witnesses.

HEINRICH JORDAN. [L. S.]

Witnesses:
CHAS. J. WRIGHT,
ALFRED HENKEL.

---

Copies of this patent may be obtained for five cents each, by addressing the "Commissioner of Patents, Washington, D. C."

---

Corrections in Letters Patent No. 999,797.

It is hereby certified that in Letters Patent No. 999,797, granted August 8, 1911, upon the application of Heinrich Jordan, of Leverkusen, near Cologne, Germany, for an improvement in "Reddish-Blue Trisazo Dyes" errors appear in the printed specification requiring correction as follows: Page 1, line 44, the number "100" should read $180$; same page, line 88, formula, the symbol "$C_8H_5$" should read $C_6H_5$; and that the said Letters Patent should be read with these corrections therein that the same may conform to the record of the case in the Patent Office.

Signed and sealed this 3d day of October, A. D., 1911.

[SEAL.]

E. B. MOORE,
Commissioner of Patents.

It is hereby certified that in Letters Patent No. 999,797, granted August 8, 1911, upon the application of Heinrich Jordan, of Leverkusen, near Cologne, Germany, for an improvement in "Reddish-Blue Trisazo Dyes" errors appear in the printed specification requiring correction as follows: Page 1, line 44, the number "100" should read *180;* same page, line 88, formula, the symbol "$C_5H_5$" should read $C_6H_5$; and that the said Letters Patent should be read with these corrections therein that the same may conform to the record of the case in the Patent Office.

Signed and sealed this 3d day of October, A. D., 1911.

[SEAL.] E. B. MOORE,

*Commissioner of Patents.*